Oct. 17, 1939.  C. HANKINS  2,176,177
RAILWAY CAR BRAKE RIGGING
Filed Dec. 3, 1938   3 Sheets-Sheet 1
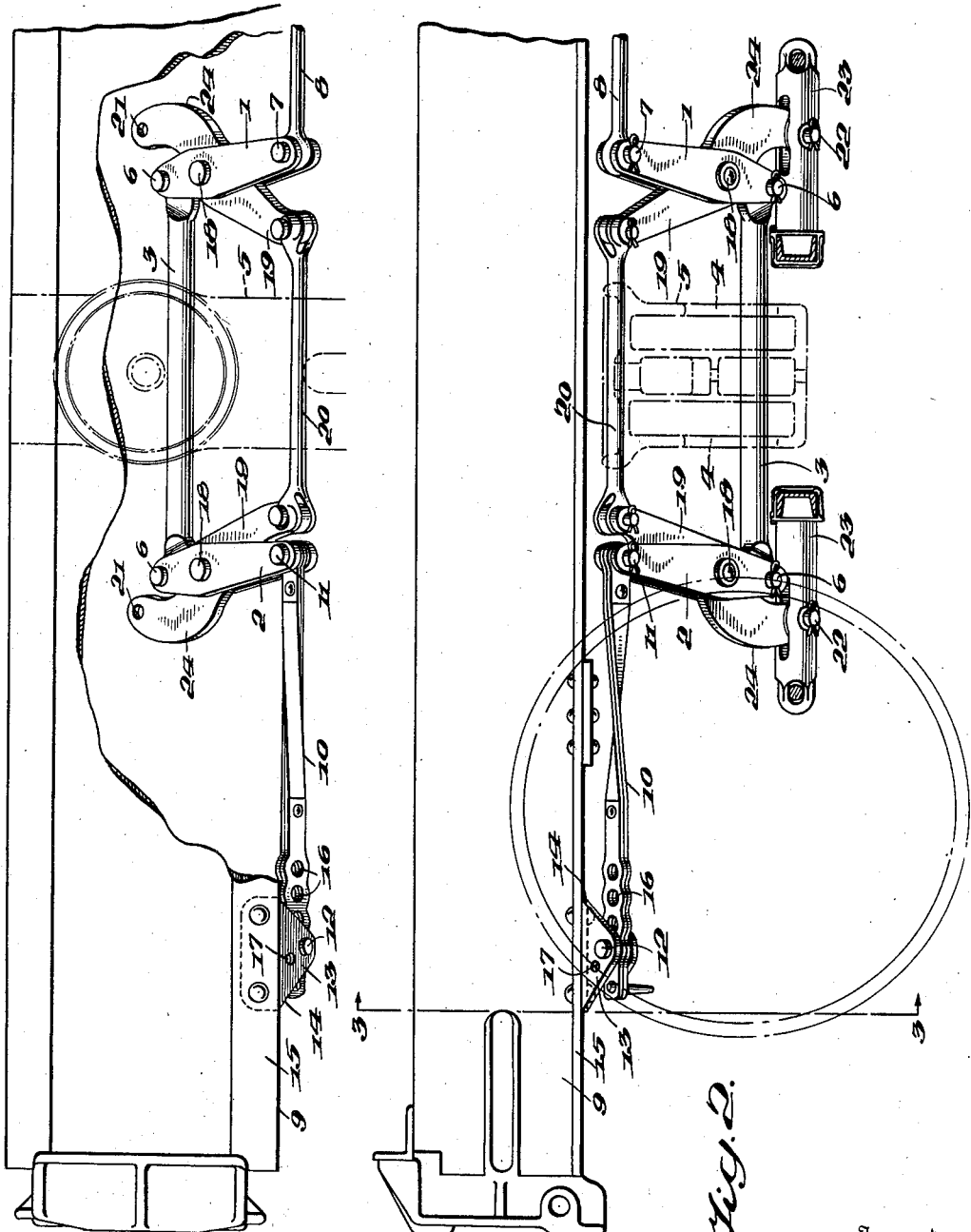

Oct. 17, 1939.　　　　C. HANKINS　　　　2,176,177
RAILWAY CAR BRAKE RIGGING
Filed Dec. 3, 1938　　　　3 Sheets-Sheet 2
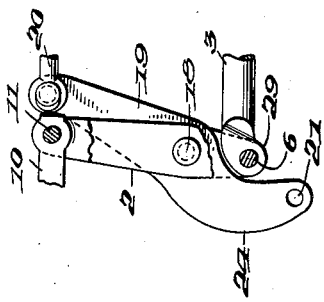
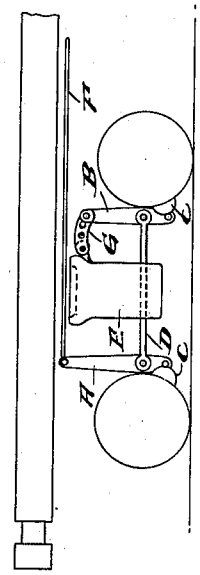
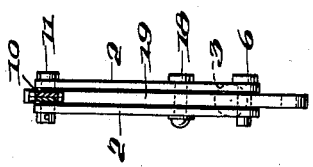
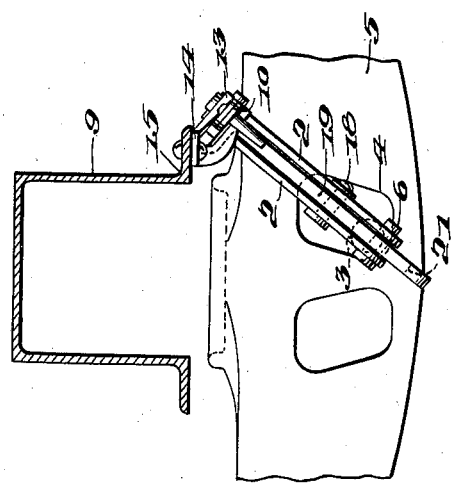
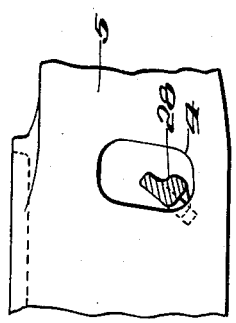
Inventor
Cyrus Hankins
By Ritter, Meehlin & Muir
His Attorney Oct. 17, 1939.  C. HANKINS  2,176,177
RAILWAY CAR BRAKE RIGGING
Filed Dec. 3, 1938  3 Sheets-Sheet 3
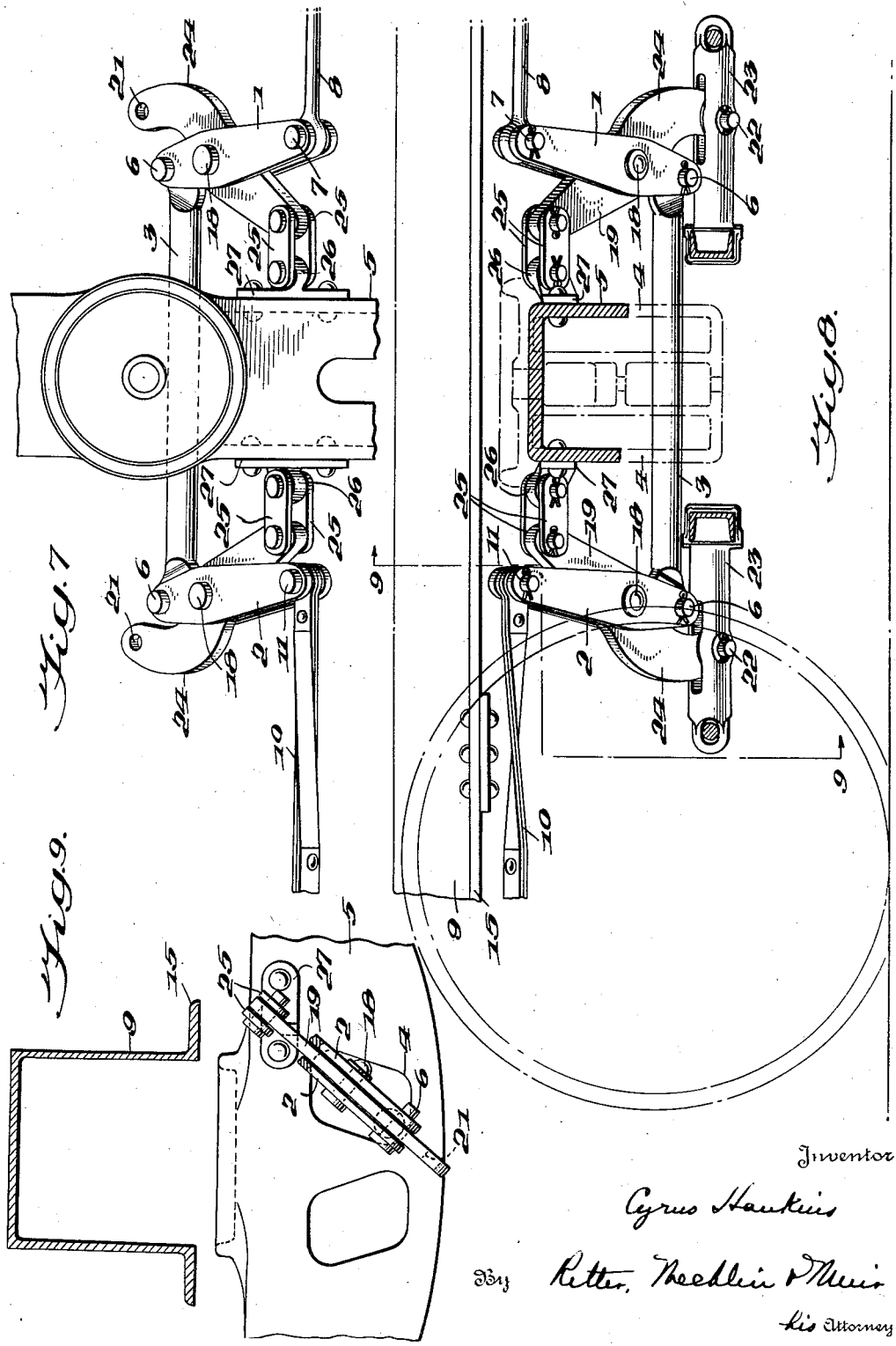

Patented Oct. 17, 1939

2,176,177

UNITED STATES PATENT OFFICE 2,176,177

RAILWAY CAR BRAKE RIGGING

Cyrus Hankins, Washington, D. C.

Application December 3, 1938, Serial No. 243,825

9 Claims. (Cl. 188—52)

My invention relates to railway cars and more particularly to improvements in the brake rigging thereof.

As is well known, the conventional brake rigging for railway cars, especially freight cars, consists of a fluid pressure cylinder mounted on the underframe of the car and a system of connected rods and levers for transmitting force from the cylinder to brake beams carrying shoes for engaging the wheels of the car. These brake beams are pivotally connected to and actuated by brake levers, the lever to which the brake applying force is first transmitted being called the live lever and the other lever, which is anchored or connected to some part of the car, being called the dead lever.

Hitherto the lower ends of the live and dead levers have been usually connected by a push rod which extends beneath the truck bolster, as well as beneath the spring plank in cases where the truck construction includes such an element; and the upper end of the dead lever has usually been connected to the truck bolster. This connection of the dead lever to the truck bolster has been found to be objectionable, since the brake force, due to the eccentricity of its point of application and its point of reaction with respect to the pivotal center of the truck, sets up a torsional force of considerable magnitude in the truck. This torsional force tends to cause the truck to rotate relatively to the car underframe, thus moving the truck as a whole out of square and its parts out of alignment. The result is that the normal functions for which the truck is designed are seriously impaired and some of its parts are subjected to increased wear.

These undesirable results have been eliminated from the conventional brake rigging by connecting the upper end of the dead lever to the underframe of the car instead of to the truck bolster, so that the brake force is transmitted from the brake rigging to the underframe rather than to the truck of the car, whereby the latter is relieved from all abnormal and eccentric strains and thus is free to function efficiently.

Because of its location beneath the truck bolster, the push rod which connects the live and dead levers has been, however, the cause of considerable trouble, for in this position it is located in such close proximity to the road-bed that it is sometimes bent or broken by obstructions along the right-of-way, such as ice and snow which not infrequently collect in the winter time on crossings. With the advent of what is now known in the art as spring plankless trucks, which are equipped with bolsters having openings in their side walls, the brake rigging has been modified to eliminate this objection by connecting the push rod to the live and dead levers above the points to which the brake beams are connected thereto and in passing the push rod through the bolster instead of by connecting the push rod to the lower ends of the levers below the brake beams and in having the rod pass beneath the bolster. This transposition of the points of connection of the push rod and the brake beams with the live and dead levers has necessitated an interchange in the positions of the live and dead levers; that is to say, the dead lever in this modified form of brake rigging is located in the position occupied by the live lever in the conventional form of brake rigging and the live lever of the modified form is located in the position occupied by the dead lever in the conventional form.

While obviating the difficulty encountered with the push rod in the conventional type of brake rigging, this modified type, however, is objectionable in that the dead lever cannot practically be connected to the underframe and, due to the location of the live lever, the pull rod for actuating it must pass over the top of the truck bolster with the result that the brake forces are eccentrically applied to the truck and tend to move it out of square and the truck bolster at times fouls the pull rod and thus prevents the proper release of the brakes.

The principal object of the present invention, therefore, is to provide a brake rigging having a push rod connecting the live and dead levers above the points of connection of the brake beams thereto and in which the dead lever may be connected to the underframe of the car instead of to the truck bolster and the live lever may be actuated by a pull rod which does not pass across the top of the truck bolster.

A primary feature of the invention consists in providing a brake rigging with a pair of levers connected at their upper ends and having brake beams connected to their lower ends, and associating said levers with live and dead levers to which they are respectively pivotally connected, the live and dead levers being connected by a rod disposed above the brake beams and the upper end of the dead lever being connected to the underframe of the car.

Another feature of the invention consists in connecting to the underframe of the car a dead lever of a brake rigging which is connected with the live lever thereof by a push rod which passes through the bolster of the car truck.

Other and more specific features of the invention, residing in advantageous forms, combinations and relations of parts, will hereinafter appear and be particularly pointed out in the claims.

In the drawings,

Figure 1 is a fragmentary view of the brake rigging of a railway car embodying my invention and of adjoining parts of the car.

Figure 2 is a side elevational view of the portions of the brake rigging and car illustrated in Figure 1.

Figure 3 is a sectional view taken on line 3—3 of Figure 2, the brake beam being omitted.

Figure 4 is a side elevational view of a portion of the brake rigging in an upright position.

Figure 5 is an end view of the construction illustrated in Figure 4 as seen from the left hand side of that figure.

Figure 6 is a fragmentary view of a portion of a truck bolster illustrating in section a modified form of the push rod connecting the live and dead levers of the brake rigging.

Figure 7 is a fragmentary plan view similar to Figure 1 of the brake rigging of a railway car embodying a modified form of the invention.

Figure 8 is a side elevational view of the brake rigging illustrated in Figure 3.

Figure 9 is a detail sectional view taken on line 9—9 of Figure 8, the brake beam being omitted.

Figure 10 is a diagrammatic view of the modified type of brake rigging heretofore described.

In Figure 10 of the drawings, the reference letters A and B indicate the live and dead levers respectively, C the brake shoes which are mounted on brake beams connected to the lower ends of the levers, D the push rod which passes through the bolster E and connects the levers, F the pull rod connected to the upper end of the live lever and G the member which connects the upper end of the dead lever to the truck bolster. In addition to having the disadvantages heretofore pointed out, this modified type of brake rigging is dangerous to adjust, as it is necessary for a trainman to get under the car between the trucks in order to get at the upper end of the dead lever. Moreover, the eccentricity of the brake force with respect to the pivotal axis of the truck increases in this type of brake rigging during an application of the brakes instead of decreasing as it does in the conventional type of brake rigging where the upper end of the dead lever is connected to the truck bolster.

To eliminate all of the objections inherent in the type of brake rigging illustrated in Figure 10 of the drawings and yet to retain the advantages resulting from connecting the push rod to the live and dead levers above the points to which the brake beams are connected thereto, I have devised the brake rigging illustrated in Figures 1 to 9, inclusive, of the drawings wherein 1 designates the live lever, 2 the dead lever and 3 the push rod which is pivotally connected to the lower ends of the live and dead levers and passes through openings 4 in the side walls of the bolster 5.

For a purpose which will shortly appear, the live and dead levers are each formed by a pair of laterally spaced coextensive plate-like members. The ends of the push rod are interposed between the plate members of the levers and are pivotally connected to them by pins 6. Interposed between the plate members of the live lever and pivotally connected to their upper ends by a pin 7 is a pull rod 8 which is movable by a brake cylinder, not shown, for actuating the levers.

The upper end of the dead lever is connected to the center sill 9 of the car, which forms a part of the underframe thereof, by any suitable tension member, such, for example, as the member 10 which is formed of two rigidly connected bars or plates which are twisted intermediate their ends so that their end portions will be substantially normal to each other. One of these end portions is interposed between the plate members of the dead lever and is connected to the upper end thereof by a pin 11, while the other end portion is pivotally connected by a pin 12 to a bifurcated portion 13 of a bracket 14 which is rigidly secured to a convenient part of the center sill 9, such, for example, as the laterally projecting flange 15 thereof. This latter end portion of member 10 is provided with a plurality of apertures 16 whereby the member may be secured to the underframe in different positions of adjustment to take up slack which may develop in the brake rigging and in order to provide for a still greater number of positions of adjustment in which the member may be secured to the underframe, the bifurcated portion of the bracket 14 is provided with an additional aperture 17 for receiving the pin 12, the two apertures in the bracket being spaced a less distance apart in the direction of the longitudinal axis of the car than the apertures 16 in member 10.

Interposed between the plate members of the live and dead levers respectively and pivotally connected thereto by pins 18 above the points thereof to which the push rod 3 is connected is a pair of auxiliary levers 19 whose upper ends are connected by a rod 20 which passes across the top of the bolster 5. The lower end of each of the auxiliary levers is provided with an aperture 21 for receiving a pin 22 for connecting a brake beam 23 of conventional design thereto in the usual manner. Intermediate their points of connection to the brake beam and live or dead levers, the auxiliary levers are offset as indicated at 24 and clearly shown in Figure 4 so as not to contact the ends of the push rod 3 and thus prevent the proper release of the brakes.

Instead of having the upper ends of the auxiliary levers directly connected to each other by a rod which passes across the top of the center sill, they may be connected to the truck bolster as indicated in Figures 7 to 9, inclusive, of the drawings. As there shown, the upper end of each of the auxiliary levers is movably connected by a pair of links 25 to a lug 26 or other suitable portion of a bracket 27 which may be riveted or otherwise made rigid with a convenient portion of the truck bolster. It will, of course, be appreciated that the effect of connecting the upper ends of the auxiliary levers to the bolster is the same as directly connecting them by a rod passing over the top of the bolster.

Although most of the truck bolsters now being made for spring plankless trucks have openings in their side walls which are arranged as indicated in Figure 3, some bolsters are made with openings located and shaped as illustrated in Figure 6. For bolsters having openings of this latter character, a push rod having the cross sectional shape indicated at 28 in Figure 6 will be found preferable to a push rod of circular cross sectional shape, such as illustrated in the other figures of the drawings, in order that there will be ample clearance between the push rod and the adjacent portions of the bolster which bound the openings thereof. When used with a bolster having openings such as indicated in Figure 3 sufficient clearance may be obtained for a push rod of circular cross section by offsetting the ends thereof downwardly, as indicated at 29.

From the foregoing, it will be perceived that I have devised a brake rigging in which the push rod connecting the live and dead levers is located above the brake beams and thus sufficiently elevated above the right-of-way that it will not be fouled by obstructions thereon. Yet the brake rigging is of such construction that the dead lever may be connected to the underframe of the car instead of to the truck bolster and the pull rod for actuating the brake levers does not pass over the top of the center sill.

Various modifications may, of course, be made in specific details and arrangements of parts without departing from the spirit and scope of the invention as defined in the appended claims.

What I claim is:

1. A brake rigging for railway cars having trucks provided with bolsters pivotally connected to the car underframe, said rigging including a pair of levers disposed on opposite sides of the bolster of one of the car trucks, the lower ends of said levers being adapted to be respectively connected to means for transmitting braking force to the wheels of said truck, means connecting the upper ends of said levers, a live lever pivotally connected to one of the levers of said pair, a dead lever pivotally connected to the other one of the levers of said pair, a rod connecting the lower ends of said dead and live levers, and means connecting the upper end of the dead lever to the car underframe.

2. A brake rigging for railway cars having trucks provided with bolsters pivotally connected to the car underframe, said rigging including a pair of levers connected at their upper ends and respectively disposed on opposite sides of the bolster of one of said trucks, the lower ends of said levers being adapted to be respectively connected to means for transmitting braking force to the wheels of said truck, and means for actuating said levers comprising a live lever pivotally connected intermediate its ends to one of the levers of said pair, a dead lever pivotally connected intermediate its ends to the other lever of said pair, and a pull rod connected to the upper end of the live lever, the lower ends of the dead and live levers being connected to each other and the upper end of the dead lever being connected to the car underframe.

3. A brake rigging for railway cars having trucks provided with bolsters pivotally connected to the car underframe, said rigging including live and dead levers connected adjacent their lower ends, the upper end of the live lever being connected to a pull rod and the upper end of the dead lever being connected to the car underframe, auxiliary levers pivotally connected intermediate their ends to the live and dead levers respectively, and means connecting the upper ends of said auxiliary levers, the lower ends of said auxiliary levers being adapted to be respectively connected to means for transmitting braking force to the wheels of said car truck.

4. A brake rigging for railway cars having trucks provided with bolsters pivotally connected to the car underframe, said rigging including live and dead levers disposed on opposite sides of the bolster of one of the car trucks, a push rod extending through the truck bolster connecting the lower ends of said levers, a pull rod connected to the upper end of the live lever, means connecting the upper end of the dead lever to the car underframe, pivoted auxiliary levers respectively mounted on said live and dead levers, and means connecting the upper ends of said auxiliary levers, the lower ends of said auxiliary levers being adapted to be respectively connected to means for transmitting braking force to the wheels of said truck.

5. A brake rigging for railway cars having trucks provided with bolsters pivotally connected to the car underframe, said rigging including live and dead levers connected adjacent their lower ends and disposed on opposite sides of the bolster of one of the car trucks, a pull rod connected to the upper end of the live lever, means connecting the upper end of the dead lever to the car underframe, pivoted auxiliary levers respectively mounted on the live and dead levers, the lower ends of said auxiliary levers being adapted to be respectively connected to means for transmitting braking force to the wheels of said truck, and means passing across the top of the truck bolster connecting the upper ends of the auxiliary levers.

6. A brake rigging for railway cars having trucks provided with bolsters pivotally connected to the car underframe, said rigging including live and dead levers connected adjacent their lower ends and disposed on opposite sides of the bolster of one of the car trucks, a pull rod connected to the upper end of the live lever, means connecting the upper end of the dead lever to the car underframe, and pivoted auxiliary levers respectively mounted on the live and dead levers, the upper ends of said auxiliary levers being pivotally connected to the truck bolster being adapted to be respectively connected to means for transmitting braking force to the wheels of said truck.

7. A brake rigging for railway cars having trucks provided with bolsters pivotally connected to the car underframe, said rigging including live and dead levers connected adjacent their lower ends and disposed on opposite sides of the bolster of one of the car trucks, a pull rod connected to the upper end of the live lever, means connecting the upper end of the dead lever to the car underframe, pivoted auxiliary levers respectively mounted on the live and dead levers, and links respectively connecting the upper ends of said auxiliary levers to the truck bolster, the lower ends of said auxiliary levers being adapted to be respectively connected to means for transmitting braking force to the wheels of said truck.

8. A brake rigging for railway cars having trucks provided with bolsters pivotally connected to the car underframe, said rigging including live and dead levers disposed on opposite sides of the bolster of one of the car trucks, a push rod extending through the truck bolster connecting the lower ends of said levers, a pull rod connected to the upper end of the live lever, means connecting the upper end of the dead lever to the car underframe, pivoted auxiliary levers respectively connected intermediate their ends to the live and dead levers, and means connecting the upper ends of said auxiliary levers, the lower ends of the auxiliary levers being adapted to be respectively connected to means for transmitting braking force to the wheels of said truck.

9. A brake rigging for railway cars having trucks provided with bolsters pivotally connected to the car underframe, said rigging including a pair of levers connected adjacent their upper ends and disposed on opposite sides of the bolster of one of the car trucks, the lower ends of said levers being adapted to be respectively connected to means for transmitting braking force to the wheels of said truck, and means for actuating said levers, said last named means comprising live and dead levers respectively connected intermediate their ends to the levers of said pair, said live and dead levers being each formed of a pair of spaced platelike members disposed on opposite sides of the lever to which it is connected, a pull rod connected to the upper end of the live lever, a push rod extending through the truck bolster connecting the lower ends of the live and dead levers, and means connecting the upper end of the dead lever to the car underframe.

CYRUS HANKINS.